United States Patent

Sakakibara

[11] Patent Number: 5,798,590
[45] Date of Patent: Aug. 25, 1998

[54] MULTI-DEGREE-FREEDOM ELECTRIC MOTOR

[75] Inventor: Kiyokatsu Sakakibara, Komaki, Japan

[73] Assignee: Mitsubishi Jukogyo Kabushiki Kaisha, Tokyo, Japan

[21] Appl. No.: 875,938

[22] PCT Filed: Dec. 12, 1996

[86] PCT No.: PCT/JP96/03622

§ 371 Date: Aug. 8, 1997

§ 102(e) Date: Aug. 8, 1997

[87] PCT Pub. No.: WO97/23030

PCT Pub. Date: Jun. 26, 1997

[30] Foreign Application Priority Data

Dec. 15, 1995 [JP] Japan ................................. 7-326986

[51] Int. Cl.$^6$ .................... H02K 21/14; H02K 21/12; H02K 1/27
[52] U.S. Cl. ................................... 310/156; 310/261
[58] Field of Search ................................... 310/156, 261

[56] References Cited

U.S. PATENT DOCUMENTS

| | | | |
|---|---|---|---|
| 4,661,737 | 4/1987 | Barri | 310/166 |
| 4,739,241 | 4/1988 | Vachtsevanos et al. | 310/166 |
| 5,204,573 | 4/1993 | Bederson et al. | 310/154 |
| 5,413,010 | 5/1995 | Nakanishi et al. | 310/156 |

FOREIGN PATENT DOCUMENTS 6253528  9/1994  Japan.

*Primary Examiner*—Clayton E. Laballe
*Attorney, Agent, or Firm*—Wenderoth, Lind & Ponack, L.L.P.

[57] ABSTRACT

The present invention provides a multi-degree-of-freedom electric motor having a spherical rotor which is able to obtain a uniform torque and which achieves a fine and smooth rotational control. A plurality of projections consisting of magnetic material are disposed on surface of spherical rotor and a spherical stator is disposed with a predetermined space therefrom. Electromagnets are buried in the surface of the stator with predetermined intervals. The spherical rotor is caused to float in a non-contact state by gas jetted from spherical static pressure bearing via gas cylinder and pressure pipe. By the controller of the present invention, electromagnets of the stator are excited to a desired position in $\alpha/\beta/\gamma$ directions of orthogonal coordinates, and upon action with the projections, the spherical rotor is rotated to the position.

2 Claims, 5 Drawing Sheets

$l_1 = 0.40R$
$l_2 = 0.35R$
$l_3 = 0.41R$
(R IS A SPHERICAL RADIUS)

MULTI-DEGREE-FREEDOM ELECTRIC MOTOR

BACKGROUND OF THE INVENTION

1. Field of the Invention

The present invention relates to an electric motor having a spherical rotor which is able to rotate in a multi-degree-of-freedom.

2. Description of the Prior Art

As a prior art, there is one, for example, disclosed by the Japanese laid-open patent application No. Hei 5(1993)-64417, construction of which is shown in FIGS. 5 and 6. In FIG. 5, in an outer surface of a spherical rotor 1, which is hollow, a plurality of permanent magnets 2 are buried in a lattice state so that adjacent polarities are different from each other as shown in FIG. 6, and various detectors and the like 40 are provided within the spherical rotor 1.

On an outer side of the spherical rotor 1, there is provided a stator 3 with a certain space therefrom, and in a concave surface of the stator 3 which opposes the surface of the spherical rotor 1, a plurality of electromagnets are buried in a lattice state.

Numeral 5 designates a bearing which supports the spherical rotor 1 in a non-contact state. The bearing 5 causes the spherical rotor 1 to float by jetted gas supplied from a gas cylinder 6 via a pressure pipe 9.

Numeral 8 designates a controller, which functions to compute a respective size of components in a direction, β direction and γ direction in 3 axes orthogonal coordinates based on an actuation command (vector) for the spherical rotor 1, to compute a relative position of the permanent magnets 2 and the electromagnets based on an input of a current position in the α direction, β direction and γ direction from a sensor (not shown) and to excite the electromagnets of the stator 3 in a predetermined pattern to actuate the spherical rotor 1 to rotate in the α direction, β direction and γ direction with a time allotment proportional to the respective size of the components.

Also, the Japanese laid-open patent application No. Sho 59(1984)-17860 discloses projecting teeth consisting of a magnetic material which are provided in place of the above-mentioned permanent magnets. In this prior art, torque is obtained by an attractive force between electromagnets and magnetic substances and there is no need of changing an exciting direction of the electromagnets as in the above-mentioned prior art, thus the spherical rotor can be rotated only with "on-off" action of the electromagnets in accordance with a predetermined exciting pattern.

Further, as another prior art, the Japanese laid-open patent application No. Hei 6(1994)-253582 discloses an electric motor having a spherical rotor wherein projections of a magnetic substance are provided in a lattice state wherein each projection is provided at each apex of a plurality of objects having triangular planes inscribing a spherical enveloping surface of the spherical rotor.

Also, in U.S. Pat. No. 5,413,010, an electric motor in which permanent magnets are arranged in a lattice state on a surface of a spherical rotor is disclosed, and an art in which an electric motor having the same kind of spherical rotor is applied to a control moment gyro is disclosed in U.S. Pat. No. 5,476,018 and a similar example applied to an agitator is disclosed in U.S. Pat. No. 5,542,762, respectively.

In the above-mentioned prior art, there is a problem in that, as the permanent magnets 2 and the like are arranged on the outer surface of the spherical rotor 1 and the pitch between the permanent magnets becomes inevitably narrow in the vicinity of the pole and further as the pitch between the permanent magnets in the direction of 2 orthogonal axes and that in the oblique direction are largely different from each other, a large variation and irregularity in the torque generated by the excitation of the electromagnets occurs.

SUMMARY OF THE INVENTION

It is therefore an object of the present invention to provide a multi-degree-of-freedom electric motor which is able to obtain a uniform torque and which is able to perform a fine and smooth rotational control.

In order to attain the afore-mentioned object, the present invention provides a multi-degree-of-freedom electric motor which consists of a spherical rotor having a plurality of projections consisting of a magnetic material on a spherical surface thereof, a bearing supporting the spherical rotor rotatably and a stator disposed with a predetermined space from the spherical surface of the spherical rotor and having a plurality of electromagnets on a surface thereof opposing the spherical surface of the spherical rotor. The present invention is further characterized in that each of the projections of the spherical rotor is disposed at each triangular apex of a plurality of triangles inscribing an outer spherical surface of the spherical rotor wherein the plurality of triangles consist of a combination of two kinds of isosceles triangles, one being such that one side is 0.40 R and each of the other two sides is 0.35 R and the other being such that one side is 0.40 R and each of the other two sides is 0.41 R, where R is a spherical radius of the spherical rotor.

The present invention also provides a multi-degree-of-freedom electric motor as mentioned above, which is characterized in that each of the projections of the spherical rotor has an enveloping surface of its tip formed spherically and a non-magnetic material is filled between each of the projections so as to form a same enveloping surface.

In the multi-degree-of-freedom electric motor of the present invention, the projection consisting of a magnetic material is disposed at each triangular apex of the plurality of triangles formed on the surface of the spherical rotor and a non-magnetic material is filled between each of the projections, thus the projections are thereby disposed regularly on the entire spherical surface of the spherical rotor and a uniform repetitive magnetic field can be formed, so that a uniform torque can be obtained.

Accordingly, at the time when the electromagnets of the stator are excited with a predetermined pattern to rotate the spherical rotor to a desired direction, variations of the torque can be prevented and if the projections are disposed as many as possible, resolution is enhanced and a fine and smooth rotational control becomes possible to achieve.

In the present invention described as above, the multi-degree-of-freedom electric motor consisting of the spherical rotor having the plurality of projections consisting of a magnetic material on a spherical surface thereof, the bearing supporting the spherical rotor rotatably and the stator disposed with a predetermined space from the spherical surface of the spherical rotor and having the plurality of electromagnets on a surface thereof opposing the spherical surface of the spherical rotor, is characterized in that each of the projections of the spherical rotor is disposed at each triangular apex of the plurality of triangles inscribing the outer spherical surface of the spherical rotor and the plurality of triangles consist of a combination of two kinds of isosceles triangles. One of the triangles being such that one side is 0.40 R and each of the other two sides is 0.35 R and the other triangle being such that one side is 0.40 R and each of the other two sides is 0.41 R, where R is the spherical radius of the spherical rotor, thereby there is caused no such problem as in the prior art that the pitch between the permanent magnets in the direction of 2 orthogonal axes and that in the oblique direction are largely different from each other, and the projections being disposed uniformly on the surface of the spherical rotor, the torque can be made uniform and a fine and smooth rotational control becomes possible.

DESCRIPTION OF THE PREFERRED EMBODIMENTS

Figure 1:
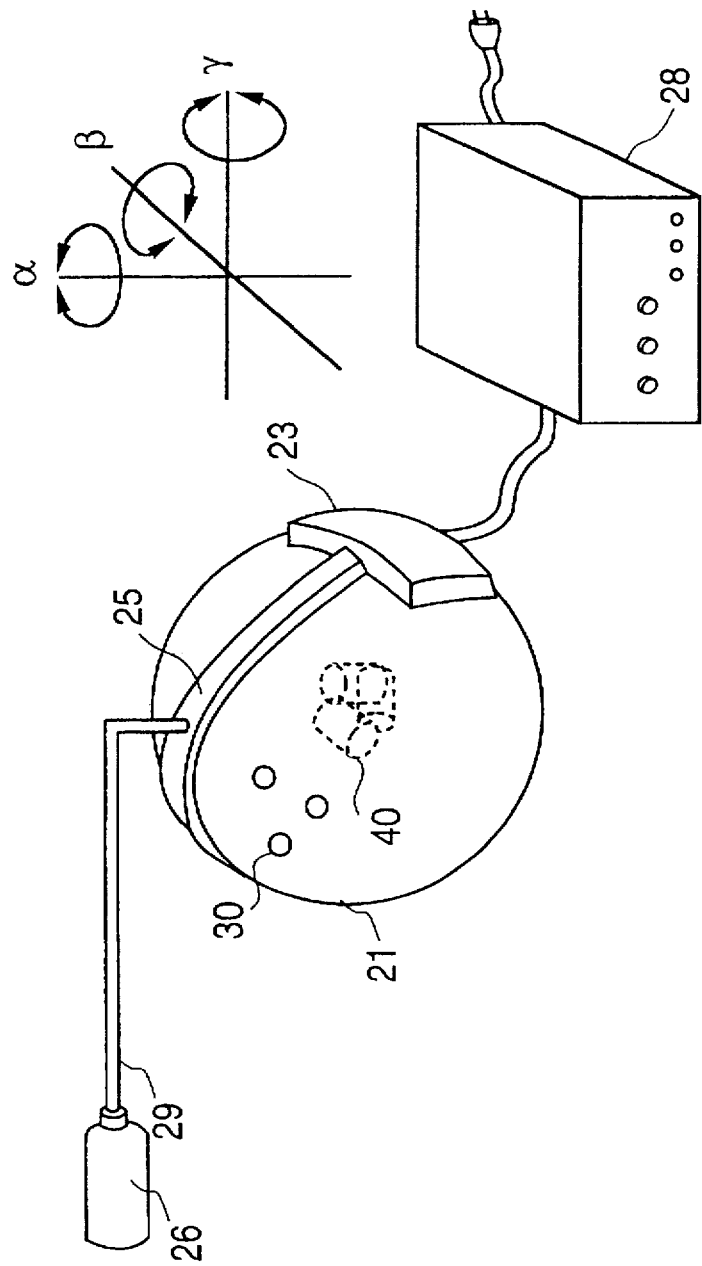
FIG. 1 is a view of entire construction of a multi-degree-of-freedom electric motor of one embodiment according to the present invention.

Herebelow, description is made on one embodiment according to the present invention with reference to figures. FIG. 1 is a view of entire construction of a multi-degree-of-freedom electric motor of the embodiment of the present invention, FIG. 2 is a cross sectional view of a spherical rotor of the multi-degree-of-freedom electric motor shown in FIG. 1, and FIG. 3 is a view of an arrangement of projections of the spherical rotor of FIG. 2.

In FIG. 1, numeral 21 designates a spherical rotor, which is hollow and is provided with various detectors etc. 40 therewithin. Numeral 23 designates a stator, which is partially spherical and is disposed with a certain space from a portion of the surface of the spherical rotor 21. In a side surface of the stator 23 opposing the spherical rotor 21, a plurality of electromagnets are buried with a predetermined interval from each other so that the upper surfaces of these electromagnets form a spherical surface.

Numeral 25 designates a spherical static pressure bearing which causes gas supplied from a gas cylinder 26 via a pressure pipe 29 to be jetted onto the surface of the spherical rotor 21 and which causes the spherical rotor 21 to float so as to be supported rotatably and in a non-contact state. Numeral 28 designates a controller for exciting electromagnets provided on the surface of the stator 23 with a predetermined pattern to rotate the spherical rotor 21 (control thereof is described later concretely).

Figure 2:
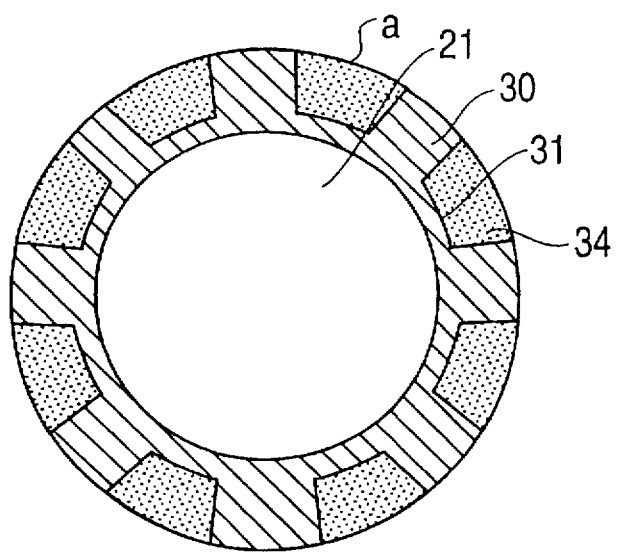
FIG. 2 is a cross sectional view of a spherical rotor of the multi-degree-of-freedom electric motor of FIG. 1.
Figure 3:
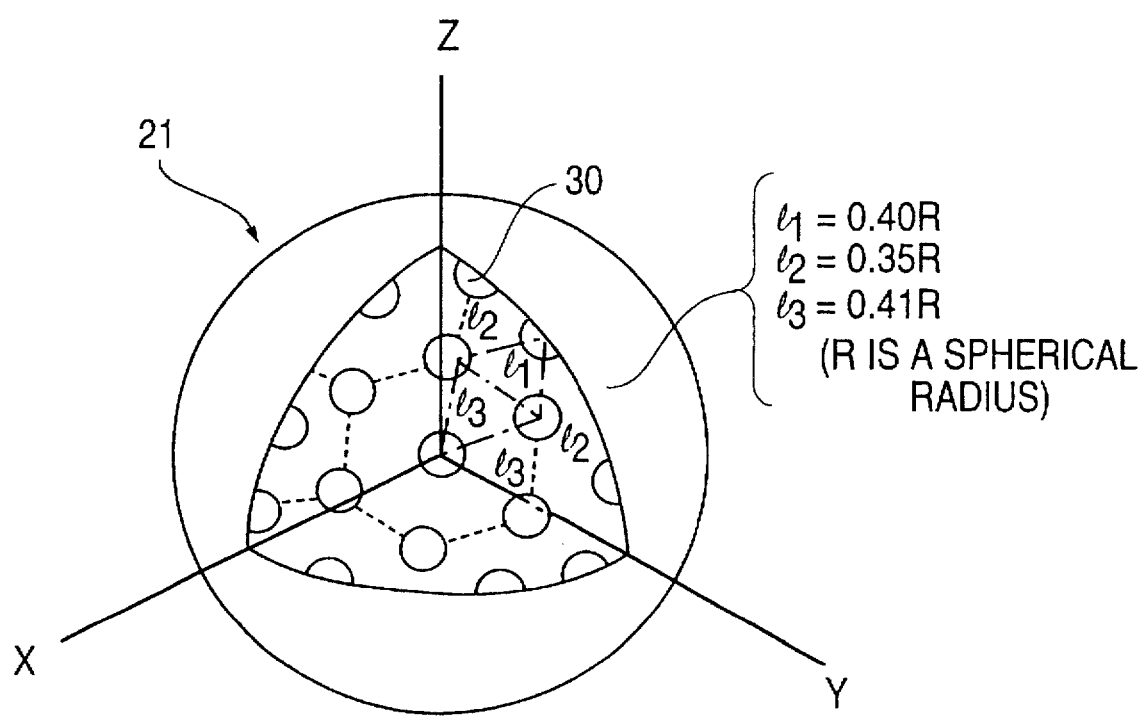
FIG. 3 is a view of an arrangement of projections of the spherical rotor of the multi-degree-of-freedom electric motor of FIG. 1.

The spherical rotor 21 is provided with a plurality of projections 30 as shown in FIG. 2. That is, as clearly understood from FIG. 2, on a spherical shell 31 of a soft magnetic material, there are provided a plurality of columnar projections 30 and also provided are spacers 34 of non-magnetic material between the projections 30. The surfaces of the projections 30 and the surfaces of the spacers 24 inscribe a spherical enveloping surface and form a spherical surface.

In FIG. 3, a one eighth portion of the spherical rotor 21 is shown. As shown there, each of the projections 30 is disposed at a position of each triangular apex of a combination of two kinds of isosceles triangles inscribing an outer spherical surface of the spherical rotor 21. One triangle being such that one side is 0.40 R and each of the other two sides is 0.35 R and the other triangle being such that one side is 0.40 R and each of the other two sides is 0.41 R, where R is a spherical radius of the spherical rotor 21 and the total number of the projections 30 amounts to 92. That is, each one projection 30 is disposed at each apex of hexagons and pentagons which form a pattern of football and at each center thereof.

Figure 4:
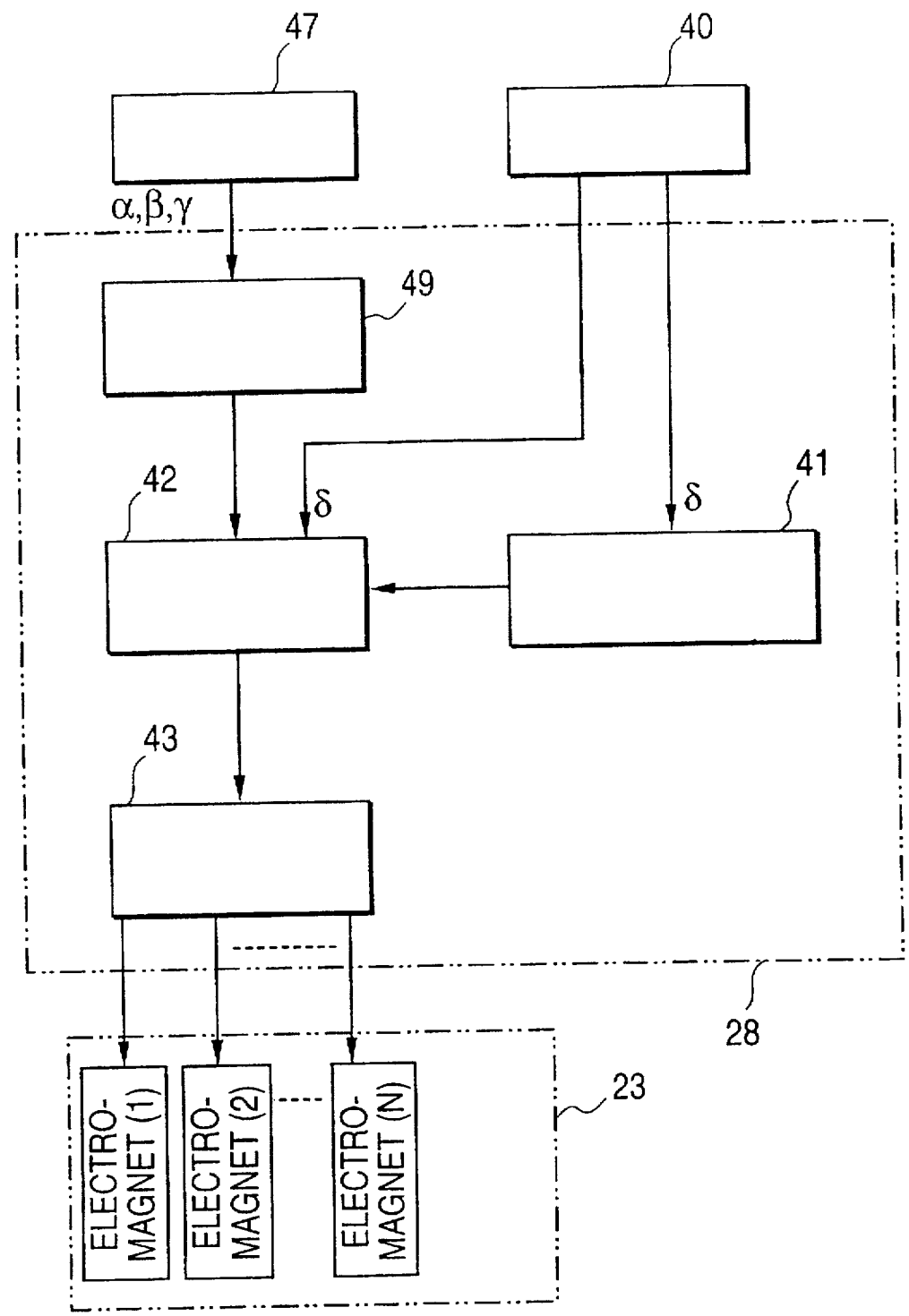
FIG. 4 is a block diagram showing a construction of a controller of the multi-degree-of-freedom electric motor of FIG. 1.
Figure 5:
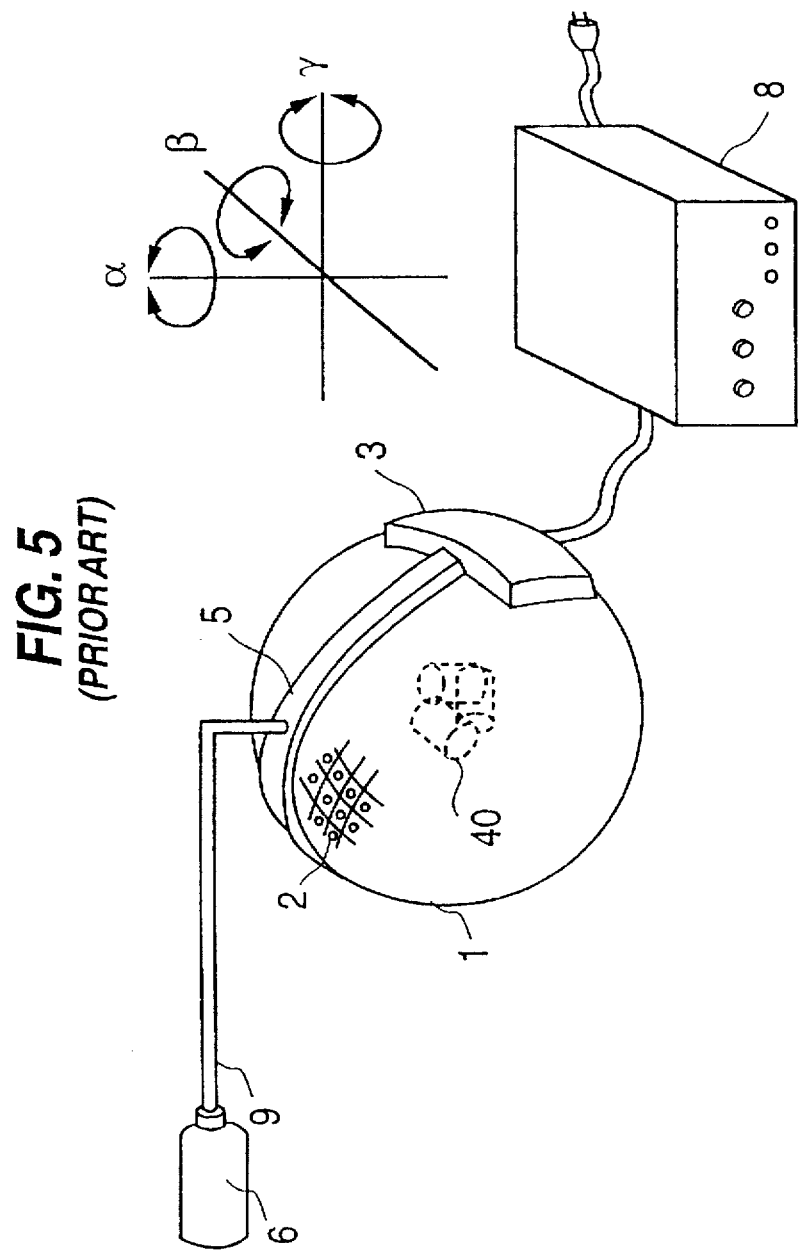
FIG. 5 is a view of entire construction of a multi-degree-of-freedom electric motor in the prior art.
Figure 6:
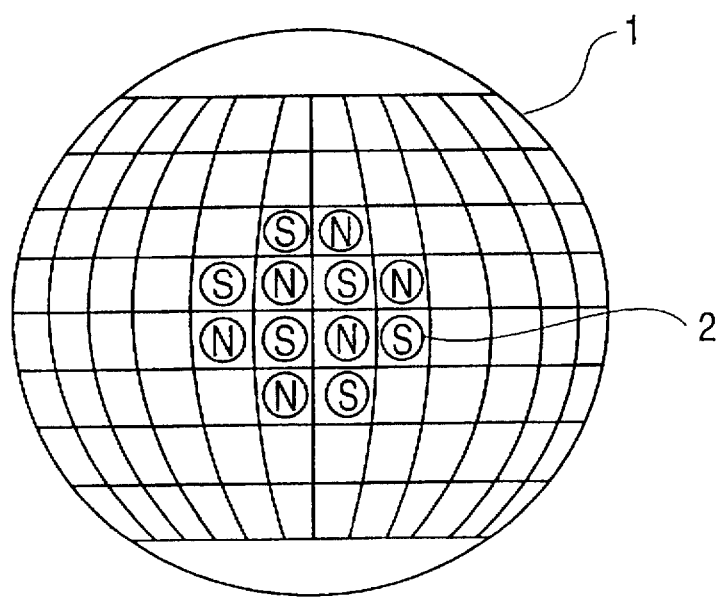
FIG. 6 is a view of an arrangement of projections of a spherical rotor of the multi-degree-of-freedom of FIG. 5.

FIG. 4 is a block diagram showing a construction of a controller 28 of the multi-degree-of-freedom electric motor of FIG. 1 and description is made on a rotational control of the spherical rotor 21. Firstly, from a position detector 47, a current position of the spherical rotor in a α direction, β direction and γ direction of orthogonal coordinates, origin of which is a center of the spherical rotor 21, is inputted into a mover/stator relative position computing part 49 within the controller 28. This relative position computing part 49 makes comparisons with a known mounting position of the stator 23 to obtain a relative position in the α direction, β direction and γ direction of the orthogonal coordinates and outputs the obtained signals to an exciting electromagnet selection part 42.

On the other hand, an actuation direction command δ (vector) is inputted from outside of the controller 28 and this command value δ is inputted into the exciting electromagnet selection part 42 and an α direction/β direction/γ direction composite ratio computing part 41, respectively. The α direction/β direction/γ direction composite ratio computing part 41 obtains a respective size of components of α direction, β direction and γ direction of the command value δ and outputs signals of α direction, β direction and γ direction to the exciting electromagnet selection part 42 with a time allotment proportional to the respective size of the components.

The exciting electromagnet selection part 42 is provided with predetermined electromagnet exciting patterns (3 patterns) for rotating the spherical rotor 21 to the α direction, β direction and γ direction based on the relative position to the stator 23, as in the prior art, and an exciting pattern corresponding to the signal from the α direction/β direction/γ direction composite ratio computing part 41 is selected first. Exciting directions (plus direction or minus direction in each direction) in the exciting pattern selected to the actuation direction command δ are obtained next. Then, upon signals of the exciting pattern, the exciting directions and the mover/stator relative position computing part 49, electromagnets to make "on/off" are selected and these selected signals are outputted to an exciting current output part 43.

The exciting current output part 43 outputs or interrupts an exciting current for each of electromagnets 1 to n disposed on the stator 23 based on the signals inputted from the exciting electromagnet selection part 42 so that the spherical rotor is rotated upon action with the projections of the spherical rotor 21.

The electromagnets of the stator 23 being excited by the predetermined pattern and the spherical rotor 21 being rotated to the desired directions, as mentioned above, wherein the projections on the surface of the spherical rotor 21 are disposed uniformly on the entire spherical surface, uniform torque without variation can be obtained, and yet the number of the projections is as large as 92, thus resolution is enhanced and a fine and smooth rotational control becomes possible.

What is claimed is:

1. A multi-degree-of-freedom electric motor comprising:

a spherical rotor comprising a plurality of projections on a spherical surface of said spherical rotor, wherein said plurality of projections comprise a magnetic material;

a bearing supporting said spherical rotor so as to allow said spherical rotor to be rotatable; and a stator disposed within a predetermined space from the spherical surface of said spherical rotor, wherein said stator comprises a plurality of electromagnets on a surface thereof which opposes the spherical surface of said spherical rotor;

wherein each of said plurality of projections of said spherical rotor is disposed at one of a plurality of triangular apexes of a plurality of triangles inscribing an outer spherical surface of said spherical rotor, wherein said plurality of triangles comprise a combination of two kinds of isosceles triangles wherein a first one of the two kinds of isosceles triangles has a side having a length of 0.40 R and has two other sides having a length of 0.35 R and wherein a second one of the two kinds of isosceles triangles has a first side having a length of 0.40 R and has two second sides having a length of 0.41 R, wherein R is a spherical radius of said spherical rotor.

2. A multi-degree-of-freedom electric motor as claimed in claim 1, further comprising a non-magnetic material disposed between each of said plurality of projections of said spherical rotor, and wherein an enveloping surface is formed by tips of each of said plurality of projections of said spherical rotor so as to form an enveloping spherical surface.

* * * * *